(12) United States Patent
Telesca

(10) Patent No.: US 9,941,962 B2
(45) Date of Patent: Apr. 10, 2018

(54) FREE SPACE OPTICAL DATA TRANSMISSION FOR SECURE COMPUTING

(71) Applicant: THE UNITED STATES OF AMERICA AS REPRESENTED BY THE SECRETARY OF THE AIR FORCE, Washington, DC (US)

(72) Inventor: Donald A. Telesca, Whitesboro, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 46 days.

(21) Appl. No.: 15/168,267

(22) Filed: May 31, 2016

(65) Prior Publication Data

US 2017/0310393 A1    Oct. 26, 2017

Related U.S. Application Data

(60) Provisional application No. 62/322,391, filed on Apr. 14, 2016.

(51) Int. Cl.
| | |
|---|---|
| *H04B 10/00* | (2013.01) |
| *H04B 10/112* | (2013.01) |
| *H04B 10/118* | (2013.01) |
| *H04B 10/80* | (2013.01) |
| *G05D 1/08* | (2006.01) |
| *H04B 10/43* | (2013.01) |
| *G06F 21/60* | (2013.01) |
| *H04L 29/06* | (2006.01) |
| *H04B 10/11* | (2013.01) |

(52) U.S. Cl.
CPC .......... *H04B 10/1125* (2013.01); *G05D 1/08* (2013.01); *G06F 21/606* (2013.01); *H04B 10/11* (2013.01); *H04B 10/118* (2013.01); *H04B 10/43* (2013.01); *H04B 10/801* (2013.01); *H04L 29/06* (2013.01)

(58) Field of Classification Search
CPC .. H04B 10/1125; H04B 10/118; H04B 10/43; H04B 10/801; G05D 1/08; G06F 21/606; H04L 29/06
USPC ................................ 398/121, 118, 128, 130
See application file for complete search history.

(56) References Cited

U.S. PATENT DOCUMENTS

| | | | | | |
|---|---|---|---|---|---|
| 4,430,699 | A | * | 2/1984 | Segarra ............. | G06F 15/17337 370/452 |
| 5,058,103 | A | * | 10/1991 | Shimizu ............... | H04B 10/077 398/139 |
| 5,473,666 | A | * | 12/1995 | Szczebak, Jr. .......... | H04M 3/22 375/345 |
| 6,259,554 | B1 | * | 7/2001 | Shigematsu ........... | H04B 10/03 359/337 |

(Continued)

FOREIGN PATENT DOCUMENTS

| | | | | |
|---|---|---|---|---|
| EP | EP 2950199 A1 | * | 12/2015 | ........... G06F 3/1204 |
| GB | 2541361 A | * | 7/2015 | ........... G06F 3/1204 |

*Primary Examiner* — Ken N Vanderpuye
*Assistant Examiner* — Abbas H Alagheband
(74) *Attorney, Agent, or Firm* — Joseph A. Mancini

(57) ABSTRACT

An apparatus and method for computer network security based on Free-Space Optical Interconnections (FSOI) for board-to-board information transmission. The addition of a controllable, interlocked shutter system creates air-gapped isolation of the boards, allowing for increased obfuscation, and enhanced security.

4 Claims, 6 Drawing Sheets

(56) References Cited

U.S. PATENT DOCUMENTS

| | | | |
|---|---|---|---|
| 6,661,546 B1* | 12/2003 | Plett | G02B 5/32 359/1 |
| 6,842,439 B2* | 1/2005 | Zeitfuss | H04B 10/1125 370/277 |
| 7,561,566 B2* | 7/2009 | Tomich | H04L 12/2803 370/389 |
| 7,565,701 B2* | 7/2009 | Telesco | G06F 9/542 710/10 |
| 8,014,682 B2* | 9/2011 | Pelley | H04B 10/803 398/129 |
| 8,340,520 B2* | 12/2012 | Kani | H04J 14/0282 398/70 |
| 8,463,130 B2* | 6/2013 | Ma | H04B 10/1149 398/115 |
| 8,750,707 B2* | 6/2014 | Sabet | H04B 10/0705 380/263 |
| 9,301,027 B2* | 3/2016 | Kauffeldt | H04Q 11/0005 |
| 9,438,337 B2* | 9/2016 | Byers | H04B 10/11 |
| 2003/0002109 A1* | 1/2003 | Hochberg | H04B 10/077 398/139 |
| 2003/0219251 A1* | 11/2003 | McMurry | H04B 10/1143 398/58 |
| 2004/0086282 A1* | 5/2004 | Graves | H04B 10/60 398/202 |
| 2004/0156638 A1* | 8/2004 | Graves | H04B 10/1125 398/129 |
| 2004/0165589 A1* | 8/2004 | Tomich | H04L 12/2803 370/389 |
| 2006/0215629 A1* | 9/2006 | Miller | H04N 7/163 370/350 |
| 2008/0044178 A1* | 2/2008 | Harrison | B23K 26/032 398/17 |
| 2008/0320298 A1* | 12/2008 | De Vaan | G06F 21/34 713/155 |
| 2009/0263138 A1* | 10/2009 | Pelley | H04B 10/803 398/131 |
| 2012/0020674 A1* | 1/2012 | Cole | H04J 14/0289 398/165 |
| 2012/0263476 A1* | 10/2012 | Sabet | H04B 10/0705 398/104 |
| 2014/0105593 A1* | 4/2014 | Vieth | H04B 10/564 398/5 |
| 2015/0349881 A1* | 12/2015 | Byers | H04B 10/11 398/38 |
| 2017/0004806 A1* | 1/2017 | Edwards | A63F 13/211 |

\* cited by examiner

FREE SPACE OPTICAL DATA TRANSMISSION FOR SECURE COMPUTING

PRIORITY CLAIM UNDER 35 U.S.C. § 119(e)

This patent application claims the priority benefit of the filing date of provisional application Ser. No. 62/322,391 having been filed in the United States Patent and Trademark Office on Apr. 14, 2016 and now incorporated by reference herein.

STATEMENT OF GOVERNMENT INTEREST

The invention described herein may be manufactured and used by or for the Government for governmental purposes without the payment of any royalty thereon.

TECHNICAL FIELD OF THE INVENTION

This invention relates generally to the field of network security measures that ensure that a secure computer network is physically isolated from unsecured networks. More specifically, this invention relates to novel security architecture based on Free-Space Optical Interconnections (FSOI) for board-to-board information transmission.

BACKGROUND OF THE INVENTION

Mission Assurance (MA), as defined by DoD Directive 3020.40 is "a process to ensure that assigned tasks or duties can be performed in accordance with the intended purpose or plan. It is a summation of the activities and measures taken to ensure that required capabilities and all supporting infrastructures are available to the DoD to carry out the National Military Strategy."

Information Assurance (IA) is the application of this directive in the cyber domain. IA activities include measures that protect and defend information and information systems by ensuring their availability, integrity, authentication, confidentiality, and non-repudiation. IA is the practice of managing risks related to the use, processing, storage, and transmission of information or data and the systems and processes used for those purposes. It can use physical, technical and administrative controls to accomplish these tasks.

In accordance with this directive, a principal responsibility of a commander is to assure mission execution in a timely manner. The reliance of a Mission Essential Function (MEF) on cyberspace makes cyberspace a center of gravity an adversary may exploit and, in doing so, enable that adversary to directly engage the MEF without the employment of conventional forces or weapons.

Joint Publication 1-02, DoD Dictionary of Military and Associated Terms, defines cyberspace as "a global domain within the information environment consisting of the interdependent network of information technology infrastructures, including the Internet, telecommunications networks, computer systems, and embedded processors and controllers," and cyberspace operations as "the employment of cyber capabilities where the primary purpose is to achieve military objectives or effects in or through cyberspace. Such operations include computer network operations and activities to operate and defend the Global Information Grid."

The U.S. Department of Defense (DoD) depends increasingly on cyberspace to execute critical missions that are vital to maintaining American military superiority in the traditional domains of land, sea, air, and space. The U.S. is arguably more at risk to an asymmetric attack vector launched by an adversary that cannot, or chooses not to, confront the U.S. in a conventional conflict. In the end, the military advantages that net-centricity provides the U.S. military concomitantly offer an adversary affordable attack vectors through cyberspace against critical missions and advanced weapon systems.

An air gap is often employed for computers and networks that must be extraordinarily secure. Frequently the air gap is not completely literal, such as via the use of dedicated cryptographic devices that can tunnel packets over entrusted networks while avoiding packet rate or size variation. This is the current state-of-the-art. What is really needed, however, is a method and or apparatus that exploits a literal air gap between boards for increased obfuscation and enhanced security.

Free Space Optics were originally developed by the military and NASA and have been used for more than three decades in various forms to provide fast communication links in remote locations. Free-Space Optical Communications (FSOC) have already been explored for next-generation military networks. FSOCs were recognized as having the potential to provide fundamental improvement to the ability to support high-capacity links for network-centric operational concepts like widespread sensor data dissemination. Additionally, it has been shown that data can be encoded using the orbital angular momentum of the light. Optical encoding is now being applied to free-space communication links and can potentially lead to improved security implemented at the classical and single photon level.

Due to the shrinking nature of silicon transistor technology, higher speed and more powerful electronic devices have been realized owing to the dense integration of millions of transistors. The need for high-speed interconnects between chips, cards, and racks have driven research beyond conventional copper based cables for data transmission due to the fundamental limitations, including the electric power consumption, heat dissipation, transmission latency and electromagnetic interference.

Indeed, the rapid advances in optical integration have allowed optical interconnect technology to now enter "inside the box", at the computer architecture subsystem level. Within the prior a several reconfigurable free-space-based high-speed card-to-card optical interconnect structures have been proposed and investigated, with demonstrated speeds up to 2.5 Gbps. Of these and of direct interest to this endeavor is the experimentally demonstrated free-space reconfigurable card-to-card optical interconnect architecture of K. Wang. et. al. that demonstrated a 30 Gb/s data rate, and the experimentally demonstrated integration of free-space optics with standard CMOS technologies by I. Savidis et al from April 2016.

OBJECTS AND SUMMARY OF THE INVENTION

It is therefore a primary object of the present invention to provide an apparatus and method to secure computers from non-secure computer networks.

It is another object of the present invention to provide an apparatus and method that exploit the benefits of free space optical communications technology to isolate the vulnerable elements of computers from non-secure computer networks.

It is yet another object of the present invention to provide an apparatus and method for physically interrupting free space optical data transfer in a manner and sequence that permits data transfer to and from a computer network while ensuring physical isolation of vulnerable computer components from the computer network.

In a preferred embodiment of the present invention, a secure computer network architecture, comprises several processor components and at least one network communications component where at least one processor component comprises a means for bidirectional optical data transfer with the network communications components and processor components and a means for unidirectional optical data transfer with the remainder of the processor components and a means for interrupting the bidirectional optical data transfer.

Still, in the preferred embodiment of the present invention, the means for interrupting the bidirectional optical data transfer comprises at least one shutter being interlockable with at least one other shutter.

Further still, the preferred embodiment of the present invention further comprises a non-transitory storage medium having a plurality of executable computer programming instructions stored therein, which, when executed by at least one processor component, cause one or more of the processor components to permit the network communications component to access data from external networks when the means for bidirectional optical data transfer between the network communications component and a first processor component is verified as enabled; to transfer the data to the first processor component; and transfer the data from the first processor component to a second processor component when the data requires storage and when means for bidirectional optical data transfer between said network communications processor and the first processor component is verified as disabled.

Briefly stated, the invention provides an apparatus and method for computer network security based on Free-Space Optical Interconnections (FSOI) for board-to-board information transmission. The addition of a controllable, interlocked shutter system creates air-gapped isolation of the boards, allowing for increased obfuscation, and enhanced security.

DETAILED DESCRIPTION OF THE PREFERRED EMBODIMENT

An air gap is a network security measure that consists of ensuring that a secure computer network is physically isolated from unsecured networks, such as the public internet or an unsecured local area network. It represents nearly the maximum protection one network can have from another (save turning the device off). It is not possible for packets or datagrams to "leap" across the air gap from one network to another.

Free-Space Optical Communications have been recognized as having the potential to provide fundamental improvement to the ability to support high-capacity links for network-centric operational concepts like widespread sensor data dissemination. It has been shown that data can be encoded using the orbital angular momentum of the light and can potentially lead to improved security implemented at the classical and single photon level.

The goal of the present invention is to provide a novel security architecture anal method based on Free-Space Optical Interconnections (FSOI) for board-to-board information transmission. The addition of an interlocked shutter system with secured isolated control, either manual or automated, will create air-gapped isolation of the boards, allow for increased obfuscation, and enhanced security.

Figure 1:
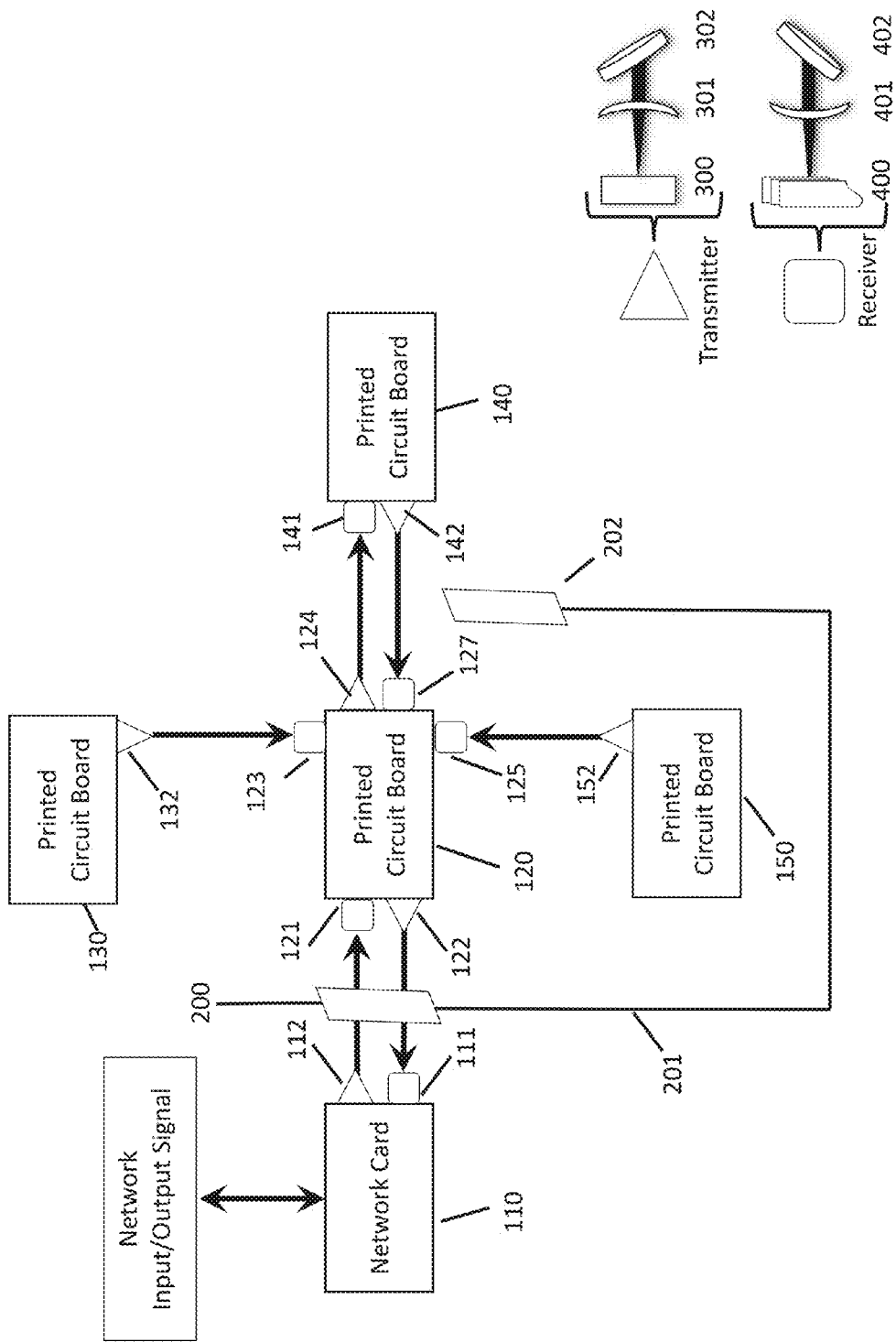
FIG. 1 is a schematic diagram representation of the present invention.

Referring to FIG. 1, the key components of the present invention include a network card 110, printed circuit boards 120, 130, 140 and 150, transmitters 112, 122, 124, 132, 142, and 152, which are described in greater detail later, receivers 111, 121, 123, 125, 127, and 141, which are described in greater detail later, a shutter 200 and 202 capable of blocking all transmission of the emitted coherent light, and a mechanical connection system 201 that interlocks the two shutters 200 and 202, which can be manually operated, or automatically operated in an isolated, secured manner.

Still referring to FIG. 1 the key components of all the transmitter units include a vertical-cavity surface-emitting laser (VCSEL) 300, focusing lens 301, and steering mirrors 302. The key components of all the receiver units include a photo diode array 400, focusing lens 401, and steering mirrors 402.

Still referring to FIG. 1, the network card 110 receives and transmits any network traffic as required by the user. In the case of receiving data, the network card uses transmitter 112 to communicate to printed circuit board 120 via receiver 121. Printed circuit board (PCB) 120 will be capable of, but is not limited to, allowing the user to perform internet browsing, email generation and consumption, and any network connectivity requirements. The user is free to execute any code on PCB 120 as there is no storage allowed on this board. If the user wishes to save a file, they must activate (manually or by secured, isolated automatic control) the interlocked shutter system 201, which uses shutter 200 to block all communication between transmitter 112 and receiver 121, thereby disallowing the network card 110 from transmitting data to PCB 120. At the same time, communication between PCB 120 and PCB 140 is allowed by removing shutter 202 from their communication path. PCB 140 will have any functionality required by the user for file read/write, file edit capabilities and to execute any code. The manual, interlocked shutter system completely isolates PCB 140 from the network, rendering it impossible for nonuser authorized transmission of data or communication back to the network card 110.

Still referring to FIG. 1, PCB 130 and 150 are equipped with only a transmitter, 132 and 152 respectively. PCB 130 will have any functionality required by the user for file read/write, file edit capabilities and to execute any code. The exclusively unidirectional nature of the transmitter 132 ensures that dissemination of any information from PCB 130 can only be authorized by the user, making it impossible for any unauthorized access or exfiltration of data from an external network. PCB 150 works in the same manner as described above for PCB 130, but differs in the information that is stored on it. PCB 150 will store, but is not limited to, all necessary registry and operating system information necessary to scrub PCB's 120 and 130.

Figure 2:
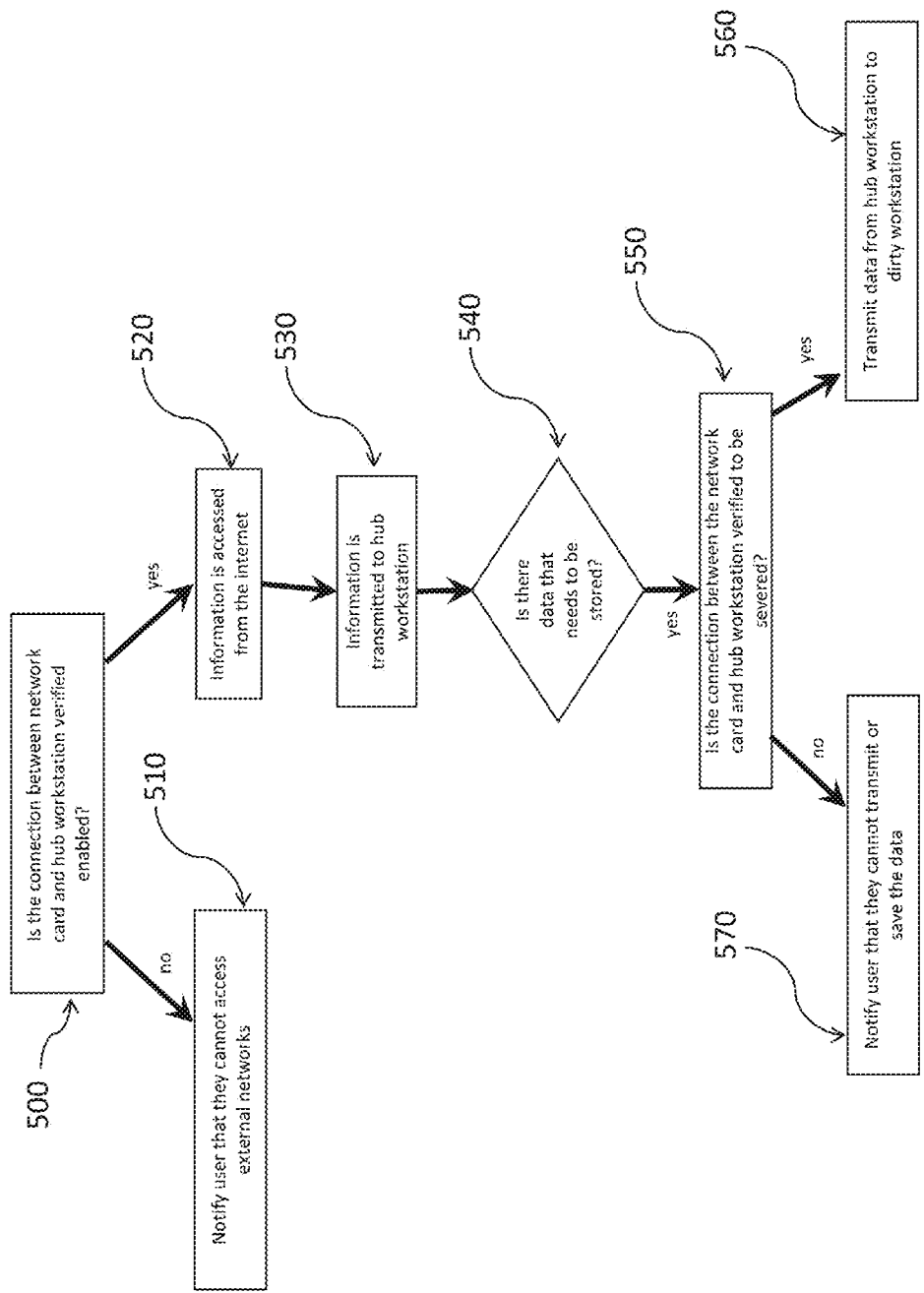
FIG. 2 is a process flow diagram for interact browsing and storage of network accessed data.

Referring to FIG. 2 and FIG. 1, concurrently, the first action is for the user to initiate a request for an internet resource. The user will be able to complete this task pending the position of the manually controlled interlocked shutter system 201. If the shutter system 201 is positioned and verified 500 by the system that the network card 110 cannot communicate with the hub workstation 120 then the user will receive a notification 510 informing them that there is no communication path to external networks. If the shutter system 201 is positioned and verified 500 that the network card 110 is capable of communicating with the hub workstation 120 then the user is free to interact 520 with external networks via data transfer 530 to the hub workstation 120.

Still referring to FIG. 2, if the user is required to save network accessed data, then they must switch the position of the shutter system 201, so that the network card 110 cannot communicate with the hub workstation 120, but the hub workstation 120 can communicate with the dirty workstation 140. Prior to any write actions being completed, the system must verify that 550 the shutter system 201 is in the correct position: blocking communication between the network card 110 and the hub workstation 120, and enabling communication 560 between the hub workstation 120 and the dirty workstation 140. If this is not verified to be true, the user will receive a notification 570 informing them that data cannot be written to the dirty workstation 140. If the shutter system 201 is verified to be in the correct position (as described above), then the user will be allowed to write 560 to the dirty work station 140.

Figure 3:
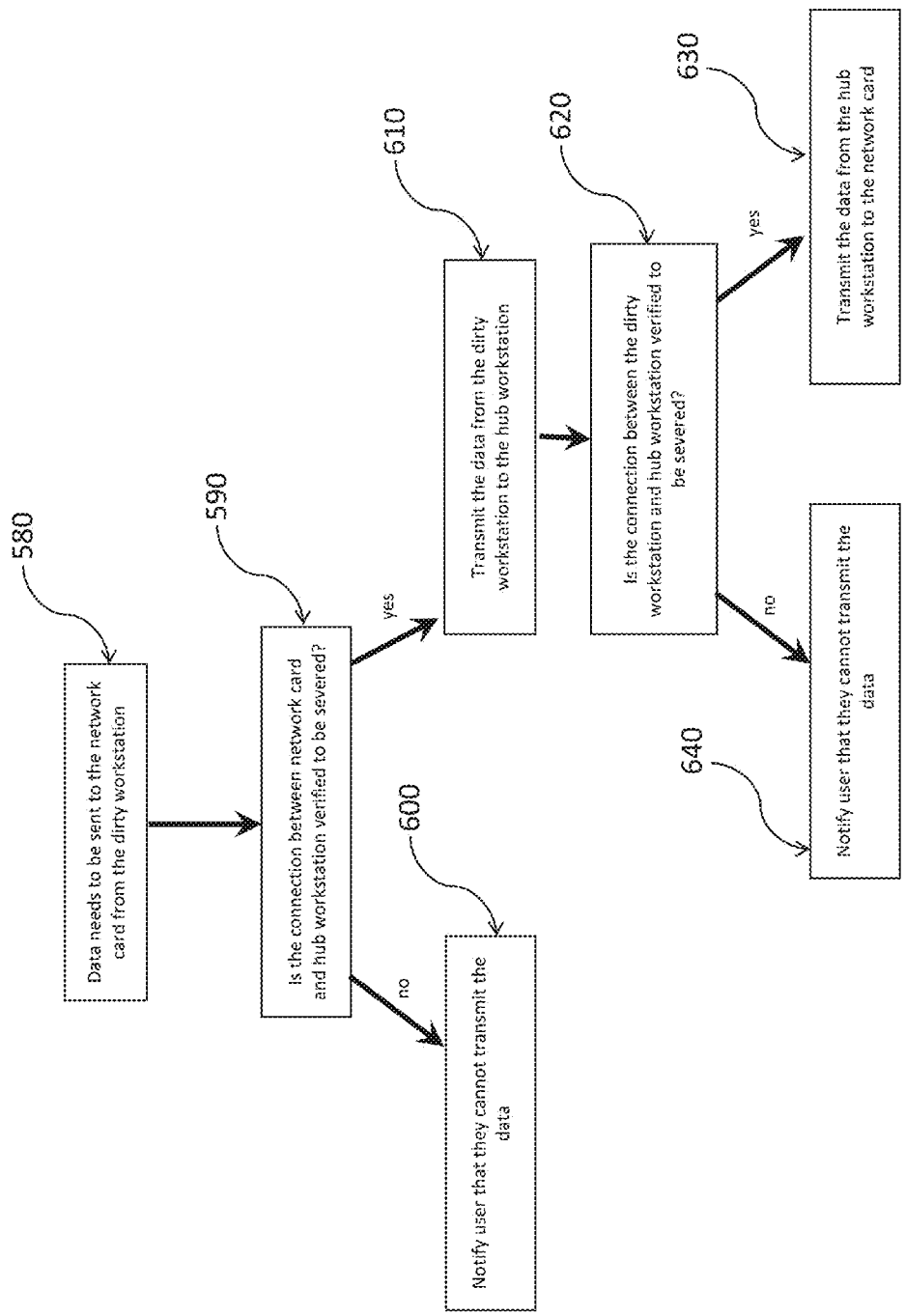
FIG. 3 is a process flow diagram for data transmission from a dirty workstation to an external network.

Referring to FIG. 3 and FIG. 1 concurrently, the first action is for the user to initiate a request to transmit data to an external network. The user will be able to complete this task 580 pending the position of the manually controlled interlocked shutter system 201. If the user is required to transmit data to an external network, then they must first switch the position of the shutter system 201, so that the network card 110 cannot communicate with the hub workstation 120, but the hub workstation 120 can communicate with the dirty workstation 140. Prior to any data transmissions being completed, the system must verify 590 that the shutter system 201 is in the correct position: blocking communication between the network card 110 and the hub workstation 120, and enabling communication between the hub workstation 120 and the dirty workstation 140. If this is not verified to be true, the user will receive a notification 600 informing them that data cannot be transmitted to the hub workstation 120. If the shutter system 201 is verified to be in the correct position (as described above), then the user will be allowed 610 to transmit data to the hub workstation 120.

Still referring to FIG. 3 and FIG. 1 concurrently, the user must now switch the shutter system 201 so that the network card 110 can communicate with the hub workstation 120, but the hub workstation 120 cannot communicate with the dirty workstation 140. If shutter system 201 is positioned and verified 620 by the system that the network card 110 can communicate with the hub workstation 120 then the user will be able to complete the transmission 630 of data to external networks. If the shutter system 201 is positioned and verified that the network card 110 cannot communicate with the hub workstation 120 then the user will receive a notification 640 informing them that there is no communication path to external networks.

Figure 4:
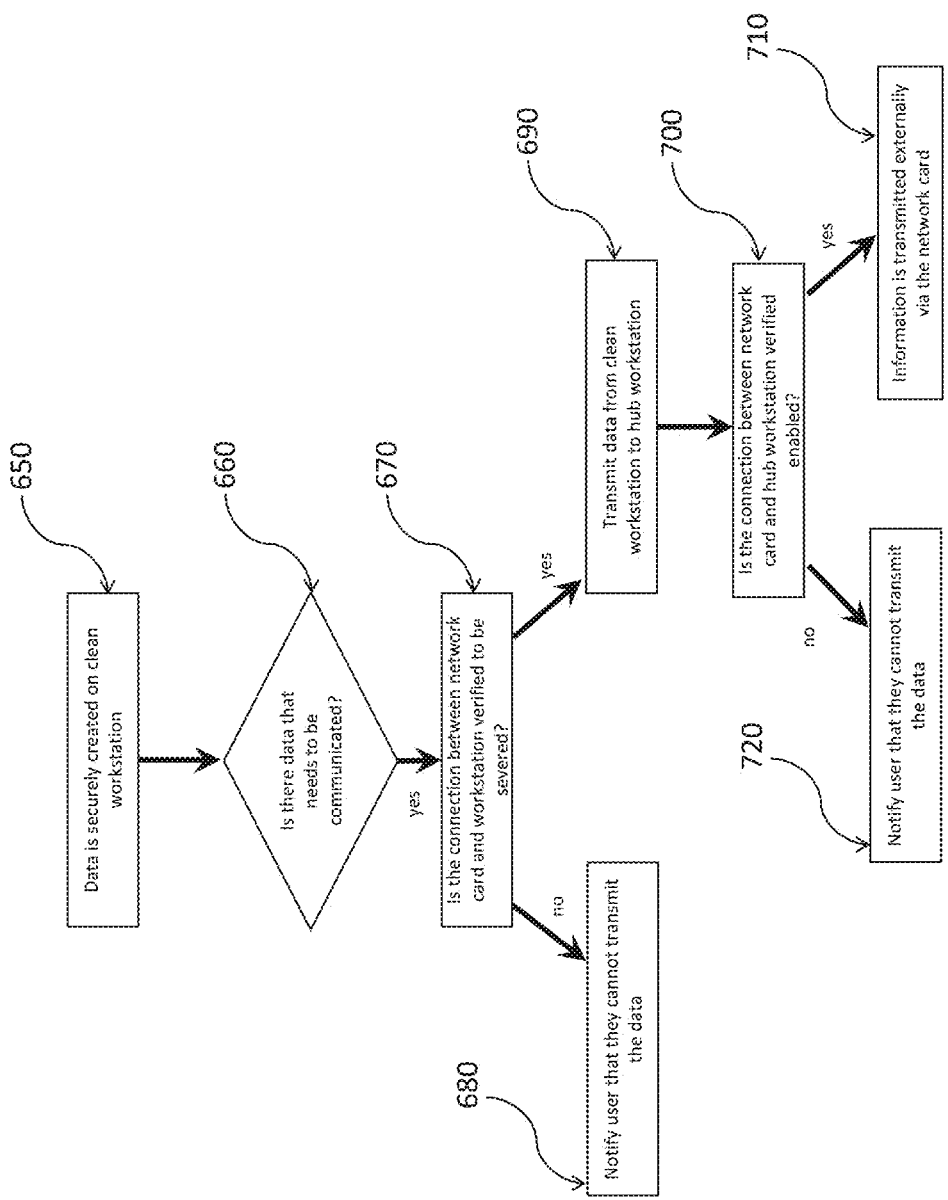
FIG. 4 is a process flow diagram for data transmission from a clean workstation to an external network.

Referring to FIG. 4 and FIG. 1 concurrently, any data created on the clean workstation 130, is completely secured 650 from external networks due to the uni-directional nature of the communication hardware 132 and 123 as described in FIG. 1. If the user must transmit 660 any secure data from the clean workstation 130, the first action is for the user to initiate a request to transmit data to an external network. The user will be able to complete this task pending the position of the manually controlled interlocked shutter system 201. The user must first switch (manually or automatically) the position of the shutter system 201, so that the network card 110 cannot communicate with the hub workstation 120, and subsequently, the system must verify 670 that the shutter system 201 is in the correct position. If this is not verified to be true, the user will receive a notification 680 informing them that data cannot be transmitted to the hub workstation 120. If the shutter system 201 is verified to be in the correct position described above), then the user will be allowed to transmit data 690 to the hub workstation 120.

Still referring to FIG. 4 and FIG. 1 concurrently, the user must now switch the shutter system 201 so that the network card 110 can communicate with the hub workstation 120, but the hub workstation 120 cannot communicate with the dirty workstation 140. If shutter system 201 is positioned and verified 700 by the system that the network card 110 can communicate with the hub workstation 120 then the user will be able to complete the transmission 710 of data to external networks. If the shutter system 201 is positioned and verified that the network card 110 cannot communicate with the hub workstation 120 then the user will receive a notification 720 informing them that there is no communication path to external networks.

Figure 5:
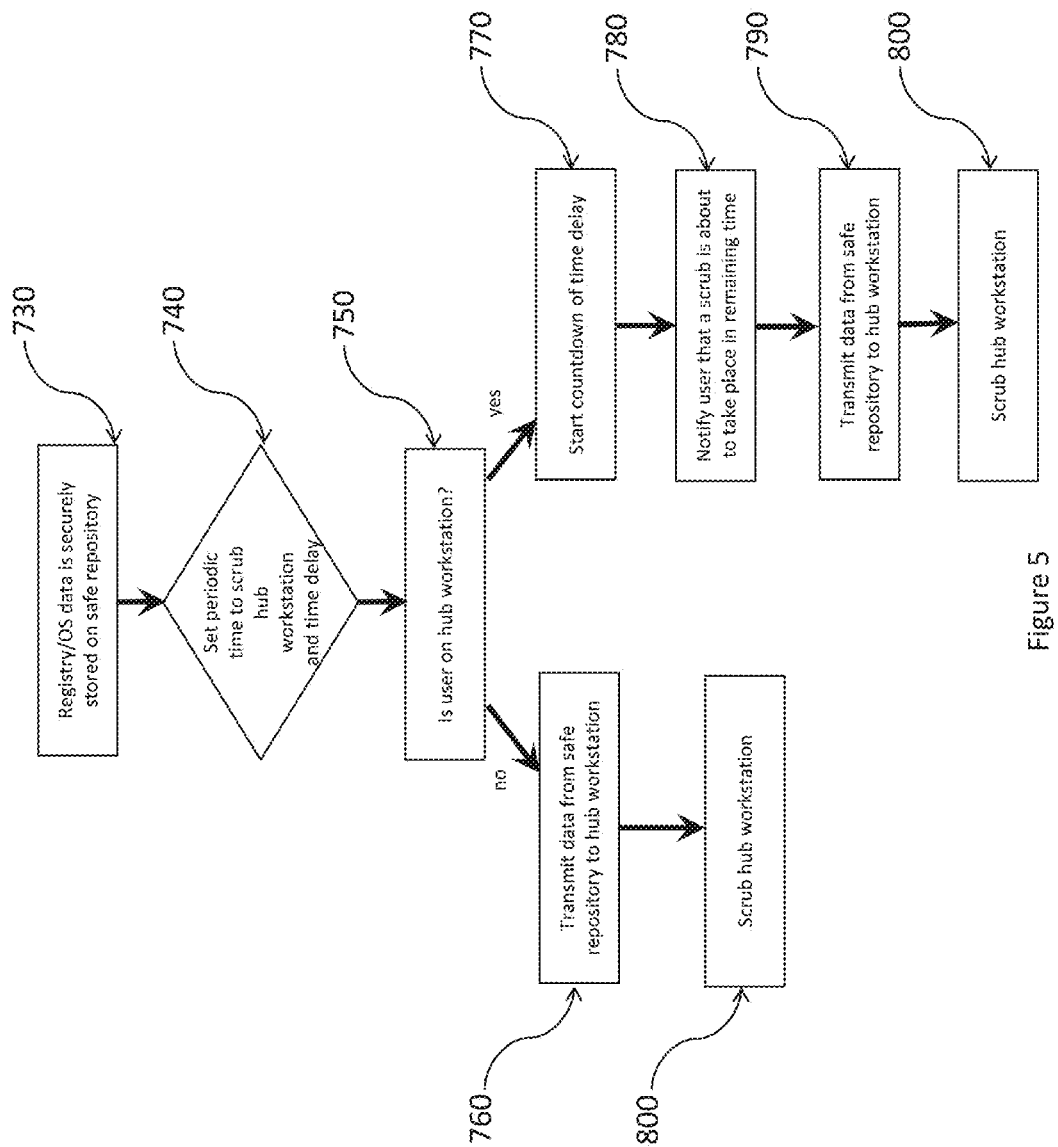
FIG. 5 is a process flow diagram for scrubbing of a hub workstation and transmission of secure registry from a secure repository.

Referring to FIG. 5 and FIG. 1 concurrently, the safe repository 150 holds 730 any necessary registry, OS or other data required for completely reformatting and reconstituting the huh workstation 120. The safe repository 150 is completely secure from external networks due to the uni-directional nature of the communication hardware 152 and 125. First, a periodic time to push the secure registry/OS data onto the hub workstation 120 must be established 740. The periodic time in the preferred embodiment of this invention is envisioned to be, but is not limited to, once every 24 hours. In addition, a time delay for initiation of the scrub should be established. The time delay resides on the safe repository and is not accessible by the user. The time delay in the preferred embodiment of this invention is envisioned to be, but is not limited to, 2 minutes.

Still referring to FIG. 5 and FIG. 1 concurrently, prior to pushing the registry/OS data, the system should verify 750 if any users are presently using the hub workstation 120. If it is verified that no users are present, then the registry/OS data will be transmitted 760 from the safe repository 150 to the hub workstation 120. The complete wipe and rebuild of the hub workstation will then take place. If a user is verified 750 to be using the hub workstation 120, then the delay clock begins counting down 770 and a notification is sent 780 to the user informing them of the imminent reformatting, along with the remaining time on the countdown clock. When time expires on the clock, the user loses all access to the hub workstation 120. The registry/OS data will then be transmitted 790 from the safe repository 150 to the hub workstation 120. The complete wipe and rebuild of the hub workstation 120 will then take place 800.

Figure 6:
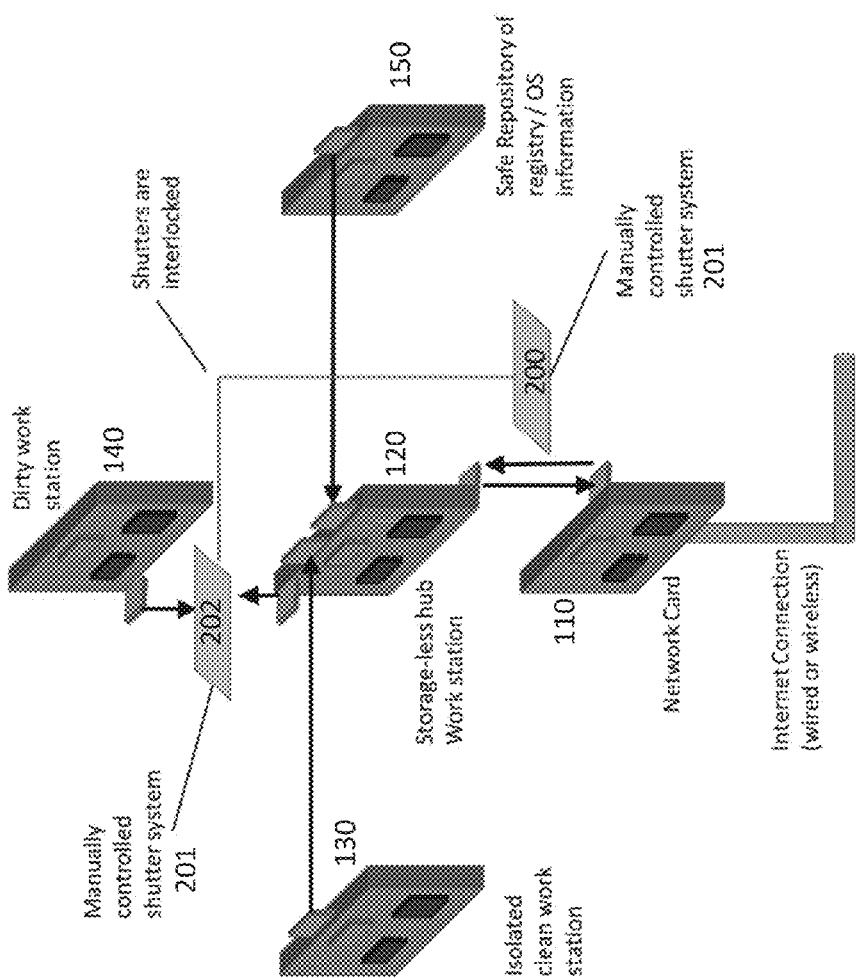
FIG. 6 is a hardware architecture depiction of the present invention.

Referring to FIG. 6, the basic components can be but are not limited to the arrangement as shown. The preferred embodiment of this invention is envisioned to be, but is not limited to printed circuit boards (PCBs) (110, 120, 130, 140,

150) mounted in a standard PC desktop configuration. The preferred embodiment is meant to demonstrate a method for air-gaping mission critical components used for processing, read/write, and storage from a direct connection to outside networks through manual or automated electromechanical shuttering (200, 201, 202). The preferred embodiment demonstrates a method for mitigating the unwanted access and exfiltration of secure data, minimizing/mitigating the damage of executed malicious code, and prohibiting executed malicious code from communicating back to the threat actor. This apparatus and method will have applications that scale up from the preferred embodiment, such as server racks and rooms, as well as applications that are scaled down from the preferred embodiment, such as portable electronic devices.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A secure computer network architecture, comprising:
    a plurality of processor components; and
    at least one network communications component;
        wherein
        at least one processor component comprises:
            means for bidirectional optical data transfer with
                said at least network communications component;
                and
            at least one of said plurality of processor components; and
            means for unidirectional optical data transfer with a
                remainder of said plurality of processor components; and
            a means for interrupting said bidirectional optical
                data transfer;
    said secure computer network architecture further comprising a non-transitory storage medium having a plurality of executable computer programming instructions stored therein, which, when executed by said at least one processor component, cause said at least one processor component to:
        permit said network communications component to access data from external networks when
            said means for bidirectional optical data transfer between said network communications component and a first processor component is verified as enabled;
        transfer said data to said first processor component; and
        transfer said data from said first processor component to a second processor component when
            said data requires storage; and
            said means for bidirectional optical data transfer between said network communications processor and said first processor component is verified as disabled.

2. The secure computer network architecture of claim 1, wherein said executable computer programming instructions further cause said at least one processor component to:
    transfer data from said second processor component to said first processor component when
        said data requires transmission from said second processor component to said network communications component storage; and
        said means for bidirectional optical data transfer between said network communications processor and said first processor component is verified as disabled;
    transfer data from said first processor component to said network communications component when
        said means for bidirectional optical data transfer between said second processor component and said first processor component is verified as disabled.

3. The secure computer network architecture of claim 2, wherein said executable computer programming instructions further cause said at least one processor component to:
    transfer data from a third processor component to said first processor component when
        data is created on said third processor component that must be communicated; and
        said means for bidirectional optical data transfer between said network communications component and said third processor component is verified as disabled; and
    transfer data from said network communications component to external networks when
        said means for bidirectional optical data transfer between said network communications component and said first processor component is verified as enabled.

4. The secure computer network architecture of claim 2, wherein said executable computer programming instructions further cause said at least one processor component to:
    store registry and operating system data in a secure repository created on a fourth processor component;
    set a periodic time to scrub said first processor component; and
    set a time delay to commence said scrub;
        transfer said data from said secure repository in fourth processor component to said first processor component and scrub said first processor component when there is no user on said first processor component;
        commence a countdown of said time delay;
        notify a user that said scrub will commence at the expiration of said countdown;
        transfer data from said secure repository in said fourth processor component to said first processor component; and
    scrub said first processor component.

* * * * *